(12) United States Patent
Daher et al.

(10) Patent No.: US 11,274,497 B2
(45) Date of Patent: Mar. 15, 2022

(54) ROCK CUTTING ASSEMBLY

(71) Applicant: Joy Global Underground Mining LLC, Warrendale, PA (US)

(72) Inventors: Nagy Daher, Punchbowl (AU); Stuart Reeves, North Wollongong (AU); Simon Fransen, Sans Souci (AU); Eddy Bagnall, Berrima (AU); Andrew Michael Clayton, Kiama Downs (AU); Christian Baloch, Mittagong (AU); Richard Boyd, Balgownie (AU)

(73) Assignee: Joy Global Underground Mining LLC, Warrendale, PA (US)

( * ) Notice: Subject to any disclaimer, the term of this patent is extended or adjusted under 35 U.S.C. 154(b) by 0 days.

(21) Appl. No.: 16/522,407

(22) Filed: Jul. 25, 2019

(65) Prior Publication Data

US 2020/0032649 A1 Jan. 30, 2020

Related U.S. Application Data

(60) Provisional application No. 62/703,360, filed on Jul. 25, 2018.

(51) Int. Cl.
*E21B 7/02* (2006.01)
*E21C 27/28* (2006.01)
(Continued)

(52) U.S. Cl.
CPC .............. *E21B 7/022* (2013.01); *E21B 7/02* (2013.01); *E21B 19/08* (2013.01); *E21C 27/28* (2013.01);
(Continued)

(58) Field of Classification Search
CPC ...... E21B 19/08; E21B 19/081; E21B 19/083; E21B 19/084; E21B 19/086;
(Continued)

(56) References Cited

U.S. PATENT DOCUMENTS

| 1,093,787 A | 4/1914 | Kuhn et al. |
| 1,735,583 A | 11/1929 | Morgan |

(Continued)

FOREIGN PATENT DOCUMENTS

| AU | 466244 | 2/1972 |
| CA | 2141984 | 8/1996 |

(Continued)

OTHER PUBLICATIONS

International Search Report and Written Opinion for Related Application No. PCT/US19/43475 dated Oct. 21, 2019 (14 pages).

(Continued)

*Primary Examiner* — Tara Schimpf
(74) *Attorney, Agent, or Firm* — Michael Best & Friedrich LLP

(57) ABSTRACT

A cutting assembly is provided for a rock excavation machine having a frame. The cutting assembly includes a boom, a cutting device, and a plurality of fluid actuators. The boom includes a base portion and a movable portion. The base portion is configured to be supported by the frame, and the movable portion is supported for sliding movement relative to the base portion in a direction parallel to a longitudinal axis of the base portion. The boom includes a wrist portion pivotably coupled to the movable portion at a pivot joint. The cutting device is supported on a distal end of the wrist portion. The fluid actuators are coupled between the base portion and the wrist portion. The fluid actuators are operable to move the movable portion and the wrist portion parallel to the longitudinal axis, and are also operable to bias the wrist portion against cutting loads exerted on the cutting device.

19 Claims, 9 Drawing Sheets

(51) Int. Cl.

| | |
|---|---|
| *E21C 31/08* | (2006.01) |
| *E21C 31/02* | (2006.01) |
| *E21B 19/08* | (2006.01) |
| E21C 35/20 | (2006.01) |
| E21C 25/16 | (2006.01) |
| E21D 9/10 | (2006.01) |

(52) U.S. Cl.

CPC .............. *E21C 31/02* (2013.01); *E21C 31/08* (2013.01); *E21B 7/025* (2013.01); *E21C 25/16* (2013.01); *E21C 35/20* (2013.01); *E21D 9/10* (2013.01)

(58) Field of Classification Search

CPC ...... E21B 19/087; E21B 19/089; E21B 19/09; E21C 31/08; E21C 27/28; E21C 31/02; E21C 35/20; E21C 25/16; E21C 25/26; E21D 9/10

See application file for complete search history.

(56) References Cited

U.S. PATENT DOCUMENTS

| | | | |
|---|---|---|---|
| 1,953,326 | A | 4/1934 | Morgan |
| 2,336,335 | A | 12/1943 | Zublin |
| 2,336,337 | A | 12/1943 | Zublin |
| 2,517,267 | A | 8/1950 | Watson |
| 2,619,338 | A | 11/1952 | Lindgren |
| 2,619,339 | A | 11/1952 | Cartlidge |
| 2,654,586 | A | 10/1953 | Berry |
| 2,659,585 | A | 11/1953 | McCallum |
| 2,745,651 | A | 5/1956 | Herrmann |
| 2,756,039 | A | 7/1956 | Barrett |
| 2,776,823 | A | 1/1957 | Barrett |
| 3,157,437 | A | 11/1964 | Gonski |
| 3,197,256 | A | 7/1965 | Hlinsky |
| 3,302,974 | A | 2/1967 | Hlinksy |
| 3,306,663 | A | 2/1967 | Webster |
| 3,353,871 | A | 11/1967 | Arentzen |
| 3,355,215 | A | 11/1967 | Haspert et al. |
| 3,408,109 | A | 10/1968 | Lockwood |
| 3,412,816 | A | 11/1968 | Lautsch |
| 3,446,535 | A | 5/1969 | Lauber |
| 3,647,263 | A | 3/1972 | Lauber et al. |
| 3,663,054 | A | 5/1972 | Dubois |
| 3,729,056 | A | 4/1973 | Paurat |
| 3,719,404 | A | 6/1973 | Sterner |
| 3,840,271 | A | 10/1974 | Sugden |
| 3,922,017 | A | 11/1975 | Cobb |
| 3,929,378 | A | 12/1975 | Frenyo et al. |
| 3,966,258 | A | 6/1976 | Dolecki |
| 3,972,571 | A | 8/1976 | Benkowski |
| 3,995,907 | A | 12/1976 | Dubois |
| 4,005,905 | A | 2/1977 | Dubois |
| 4,087,131 | A | 5/1978 | Peterson et al. |
| 4,096,917 | A | 6/1978 | Harris |
| 4,108,494 | A | 8/1978 | Kogler |
| 4,230,372 | A | 10/1980 | Marten |
| 4,248,481 | A | 2/1981 | Stoltefuss |
| 4,273,383 | A | 6/1981 | Grisebach |
| 4,302,054 | A | 11/1981 | Haskew et al. |
| 4,363,519 | A | 12/1982 | Howard |
| 4,372,403 | A | 2/1983 | Beeman |
| 4,377,311 | A | 3/1983 | Seller |
| 4,470,635 | A | 9/1984 | Paurat et al. |
| 4,516,807 | A | 5/1985 | Eagles |
| 4,548,442 | A | 10/1985 | Sugden et al. |
| 4,589,701 | A | 5/1986 | Beckmann et al. |
| 4,643,483 | A | 2/1987 | Brooks et al. |
| 4,647,112 | A | 3/1987 | Demoulin et al. |
| 4,662,684 | A | 5/1987 | Marten |
| 4,682,819 | A | 7/1987 | Masse |
| 4,741,577 | A | 5/1988 | Sato et al. |
| 4,755,002 | A | 7/1988 | Parrott |
| 4,760,513 | A | 7/1988 | Edwards |
| 4,796,713 | A | 1/1989 | Bechem |
| 4,838,614 | A | 6/1989 | Pentith et al. |
| 4,838,615 | A | 6/1989 | Oldham |
| 4,848,486 | A | 7/1989 | Bodine |
| 4,878,714 | A | 11/1989 | Barnthaler et al. |
| 4,968,098 | A | 11/1990 | Hirsch et al. |
| 5,028,092 | A | 7/1991 | Coski |
| 5,050,934 | A | 9/1991 | Brandl et al. |
| 5,087,102 | A | 2/1992 | Kiefer |
| 5,112,111 | A | 5/1992 | Addington et al. |
| 5,190,353 | A | 3/1993 | Bechem |
| 5,205,612 | A | 4/1993 | Sugden et al. |
| 5,210,997 | A | 5/1993 | Mountcastle, Jr. |
| 5,234,257 | A | 8/1993 | Sugden et al. |
| 5,601,153 | A | 2/1997 | Ensminger et al. |
| 5,676,125 | A | 10/1997 | Kelly et al. |
| 5,697,733 | A | 12/1997 | Marsh |
| 5,938,288 | A | 8/1999 | Saint-Pierre et al. |
| 6,086,257 | A | 7/2000 | Lee |
| 6,561,590 | B2 | 5/2003 | Sugden |
| 6,857,706 | B2 | 2/2005 | Hames et al. |
| 6,938,702 | B2 | 9/2005 | Saha et al. |
| 7,182,407 | B1 | 2/2007 | Peach et al. |
| 7,325,882 | B2 | 2/2008 | Sugden et al. |
| 7,384,104 | B2 | 6/2008 | Sugden |
| 7,431,402 | B2 | 10/2008 | Peach et al. |
| 7,490,911 | B2 | 2/2009 | Steinberg et al. |
| 7,695,071 | B2 | 4/2010 | Jackson et al. |
| 7,731,298 | B2 | 6/2010 | Merten et al. |
| 7,934,776 | B2 | 5/2011 | de Andrade et al. |
| 7,954,735 | B2 | 6/2011 | Belotserkovsky |
| 8,079,647 | B2 | 12/2011 | Yao et al. |
| 8,276,991 | B2 | 10/2012 | Thomson |
| 8,328,292 | B2 | 12/2012 | de Andrade et al. |
| 8,636,324 | B2 | 1/2014 | Skea |
| 8,690,262 | B2 | 4/2014 | Ebner et al. |
| 8,727,450 | B2 | 5/2014 | de Andrade et al. |
| 9,470,087 | B2 | 10/2016 | Smith et al. |
| 2002/0093239 | A1 | 7/2002 | Sugden |
| 2005/0200192 | A1 | 9/2005 | Sugden et al. |
| 2007/0090678 | A1 | 4/2007 | Peach et al. |
| 2007/0193810 | A1 | 8/2007 | Steinberg et al. |
| 2008/0156531 | A1 | 7/2008 | Boone et al. |
| 2009/0058172 | A1 | 3/2009 | DeAndrade et al. |
| 2009/0066148 | A1 | 3/2009 | Willison |
| 2009/0127918 | A1 | 5/2009 | Yao et al. |
| 2010/0019563 | A1 | 1/2010 | Thomson |
| 2010/0260563 | A1 | 10/2010 | Conroy et al. |
| 2011/0062768 | A1 | 3/2011 | Van Zyl et al. |
| 2011/0181097 | A1 | 7/2011 | Skea |
| 2012/0098325 | A1 | 4/2012 | Junker et al. |
| 2013/0057044 | A1 | 3/2013 | De Andrade et al. |
| 2014/0077578 | A1 | 3/2014 | Smith et al. |
| 2014/0091612 | A1 | 4/2014 | Rowher et al. |
| 2014/0178155 | A1* | 6/2014 | Feasey .................. E21B 33/085 |
| | | | 414/137.5 |
| 2015/0152728 | A1 | 6/2015 | Hartwig et al. |
| 2017/0204666 | A1* | 7/2017 | Galler .................... E21B 7/027 |
| 2018/0051561 | A1 | 2/2018 | Daher et al. |
| 2018/0051562 | A1 | 2/2018 | Daher et al. |
| 2018/0087380 | A1 | 3/2018 | Lugg et al. |

FOREIGN PATENT DOCUMENTS

| | | |
|---|---|---|
| CL | 35975 | 2/1988 |
| CL | 199600179 | 9/1996 |
| CL | 199900483 | 3/1999 |
| CL | 200901978 | 2/2010 |
| CN | 101778998 A | 7/2010 |
| CN | 101828004 A | 9/2010 |
| CN | 102061914 A | 5/2011 |
| CN | 102305067 | 1/2012 |
| CN | 102513998 A | 6/2012 |
| CN | 102587911 | 7/2012 |
| CN | 102606154 | 7/2012 |
| CN | 102704927 | 10/2012 |
| CN | 102733803 | 10/2012 |
| CN | 202500560 U | 10/2012 |
| CN | 202991028 U | 6/2013 |

(56) References Cited

FOREIGN PATENT DOCUMENTS

| | | |
|---|---|---|
| CN | 103206213 A | 7/2013 |
| CN | 103498671 A | 1/2014 |
| CN | 104047603 A | 9/2014 |
| CN | 104500086 A | 4/2015 |
| CN | 204283458 U | 4/2015 |
| DE | 4123307 | 12/1992 |
| DE | 4440261 | 5/1996 |
| DE | 19900906 | 7/2000 |
| EP | 0176234 A1 | 4/1986 |
| EP | 0329915 | 8/1989 |
| GB | 2214963 A | 9/1989 |
| JP | S5540058 U | 3/1980 |
| JP | H02147793 A | 6/1990 |
| RU | 1779278 C | 11/1992 |
| RU | 2044125 C1 | 9/1995 |
| RU | 2142561 C1 | 12/1999 |
| RU | 2187640 C1 | 8/2002 |
| RU | 2209979 C2 | 8/2003 |
| RU | 2276728 C1 | 5/2006 |
| RU | 2441155 C1 | 1/2012 |
| SU | 323552 A | 11/1972 |
| SU | 514097 A1 | 5/1976 |
| SU | 581263 | 11/1977 |
| SU | 619117 | 8/1978 |
| SU | 750061 | 7/1980 |
| SU | 804832 A1 | 2/1981 |
| SU | 962626 | 9/1982 |
| SU | 1328521 | 8/1987 |
| SU | 1712599 A1 | 2/1992 |
| SU | 1731946 | 5/1992 |
| SU | 1744249 A1 | 6/1992 |
| WO | 0043637 | 7/2000 |
| WO | 0046486 | 8/2000 |
| WO | 0201045 | 1/2002 |
| WO | 02066793 | 8/2002 |
| WO | 2003062587 | 7/2003 |
| WO | 03089761 | 10/2003 |
| WO | 2012156843 A2 | 9/2005 |
| WO | 2006075910 A1 | 7/2006 |
| WO | 2016055087 A1 | 4/2016 |

OTHER PUBLICATIONS

International Mining, "DynaCut Technology Achieving Breakthroughs," <https://im-mining.com/2015/12/17/dynacut-technology-achieving-breakthroughs/> web page accessed Nov. 22, 2019.
Mining3 Mining, "CRCMining Joy Global Oscillating Disc Cutter (ODC) Hard Rock Cutting Machine," <https://www.youtube.com/watch?v=anyPQWkH4rM> web page accessed Oct. 24, 2019.

* cited by examiner

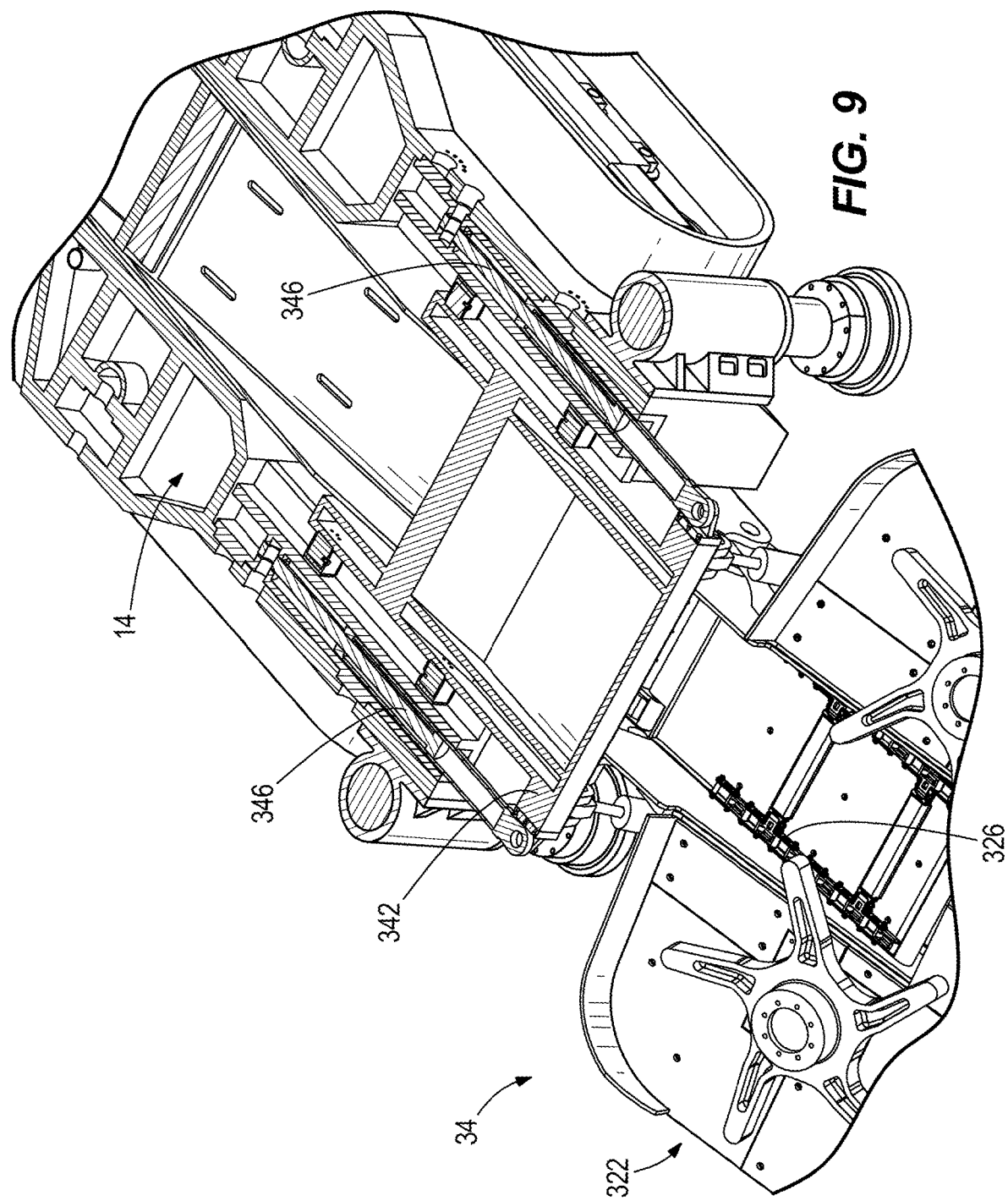

ROCK CUTTING ASSEMBLY

REFERENCE TO RELATED APPLICATION

This application claims the benefit of, prior-filed U.S. Provisional Patent Application No. 62/703,360, filed Jul. 25, 2018, the entire contents of which are incorporated by reference.

BACKGROUND

The present disclosure relates to mining and excavation machines, and in particular to a support for a rock cutting device of a mining or excavation machine.

Hard rock mining and excavation typically requires imparting large energy on a portion of a rock face in order to induce fracturing of the rock. One conventional technique includes operating a cutting head having multiple mining picks. Due to the hardness of the rock, the picks must be replaced frequently, resulting in extensive down time of the machine and mining operation. Another technique includes drilling multiple holes into a rock face, inserting explosive devices into the holes, and detonating the devices. The explosive forces fracture the rock, and the rock remains are then removed and the rock face is prepared for another drilling operation. This technique is time-consuming and exposes operators to significant risk of injury due to the use of explosives and the weakening of the surrounding rock structure. Yet another technique utilizes roller cutting element(s) that rolls or rotates about an axis that is parallel to the rock face, imparting large forces onto the rock to cause fracturing.

SUMMARY

In one independent aspect, a cutting assembly is provided for a rock excavation machine including a frame. The cutting assembly includes a boom, a cutting device, and a plurality of fluid actuators. The boom includes a base portion and a movable portion. The base portion is configured to be supported by the frame, and the movable portion is supported for sliding movement relative to the base portion in a direction parallel to a longitudinal axis of the base portion. The boom further includes a wrist portion pivotably coupled to the movable portion at a pivot joint. The cutting device is supported on a distal end of the wrist portion. The plurality of fluid actuators are coupled between the base portion and the wrist portion. The fluid actuators are operable to move the movable portion and the wrist portion parallel to the longitudinal axis, and the fluid actuators are also operable to bias the wrist portion against cutting loads exerted on the cutting device.

In some aspects, the pivot joint is a universal joint, and the fluid actuators are spaced apart at equal angular intervals about the longitudinal axis, each of the fluid actuators positioned radially outward from an outer surface of the boom.

In some aspects, the base portion is configured to be supported on a swivel to pivot laterally relative to the frame about a swivel axis, and the base portion is pivotably coupled to the swivel and supported for pivoting movement about a luff axis transverse to the swivel axis.

In some aspects, the movable portion is supported relative to the base portion by a plurality of bearings, each bearing including an outer race engaging the base portion, an inner race engaging the movable portion, and an intermediate member positioned between the outer race and the inner race.

In some aspects, extension and retraction of the fluid actuators causes the movable portion to slide relative to the base portion.

In some aspects, the movable portion includes a cross-section having a round profile, the movable portion supported for sliding movement relative to the base portion by a plurality of bearings, each bearing including an inner race and an outer race extending substantially around the profile of the movable portion.

In some aspects, the cutting assembly further comprising a collar coupled to the movable portion, and at least one torque arm coupled between the collar and the base portion.

In some aspects, the wrist portion includes a plurality of support lugs extending radially outward from an outer surface of the wrist portion, each of the fluid actuators coupled to an associated one of the support lugs.

In some aspects, the cutting device includes a cutting disc having a peripheral edge defining a cutting plane, the cutting plane oriented in a direction substantially perpendicular to a longitudinal axis of the second portion of the boom.

In some aspects, the cutting device includes a cutting disc and an excitation device, the excitation device including an eccentric mass supported for rotation in an eccentric manner and positioned proximate the cutting disc, wherein rotation of the eccentric mass induces oscillation of the cutting device.

In another independent aspect, a cutting assembly is provided for a rock excavation machine including a frame. The cutting assembly includes a boom, a cutting device, and at least one fluid actuator. The boom is supported on the frame, and the boom including a first portion and a second portion. The second portion includes a first member supported for sliding movement relative to the first portion, and the second member is pivotably coupled to the first member at a pivot joint. The cutting device is supported on the second member. The at least one fluid actuator is coupled between the first portion and the second member, and supports the second member against cutting loads exerted on the cutting device.

In some aspects, the pivot joint is a universal joint, and wherein the at least one fluid actuator includes a plurality of fluid actuators spaced apart at equal angular intervals about a longitudinal axis of the boom, each of the fluid actuators positioned radially outward from an outer surface of the boom.

In some aspects, the first portion is supported on a swivel to pivot laterally relative to the chassis about a swivel axis, and the first portion is pivotably coupled to the swivel and supported for pivoting movement about a luff axis transverse to the swivel axis.

In some aspects, the first member is supported relative to the first portion by a plurality of bearings, each bearing including an outer race engaging the first portion, an inner race engaging the first member, and an intermediate member positioned between the outer race and the inner race.

In some aspects, extension and retraction of the at least one fluid actuator causes the first member to slide relative to the first portion.

In some aspects, the cutting assembly further includes a collar coupled to the first member, and at least one torque arm coupled between the collar and the first portion.

In yet another independent aspect, a cutting assembly is provided for a rock excavation machine including a frame. The cutting assembly includes a boom, a plurality of bearings, a cutting device, and a plurality of fluid actuators. The boom is configured to be supported by the frame, and the boom includes a base portion and a movable portion received within the base portion. The movable portion is supported for sliding movement relative to the base portion in a direction parallel to a longitudinal axis of the base portion. The boom further includes a wrist portion pivotably coupled to the movable portion at a pivot joint. The bearings support the movable portion for sliding movement relative to the base portion, and each bearing includes an outer race engaging the base portion and an inner race engaging the movable portion. The cutting device is supported on a distal end of the wrist portion. The fluid actuators are coupled between the base portion and the wrist portion. The fluid actuators are operable to move the movable portion and the wrist portion parallel to the longitudinal axis, and the fluid actuators also operable to bias the wrist portion against cutting loads exerted on the cutting device.

In some aspects, the pivot joint is a universal joint, and the fluid actuators are spaced apart at equal angular intervals about a longitudinal axis of the boom, each of the fluid actuators positioned radially outward from an outer surface of the boom.

Other aspects will become apparent by consideration of the detailed description and accompanying drawings.

BRIEF DESCRIPTION OF THE DRAWINGS

FIG. 9 is a section view of the rock excavating machine of FIG. 2, viewed along section 9-9.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or fluid connections or couplings, whether direct or indirect. Also, electronic communications and notifications may be performed using any known means including direct connections, wireless connections, etc.

DETAILED DESCRIPTION

Figure 1:
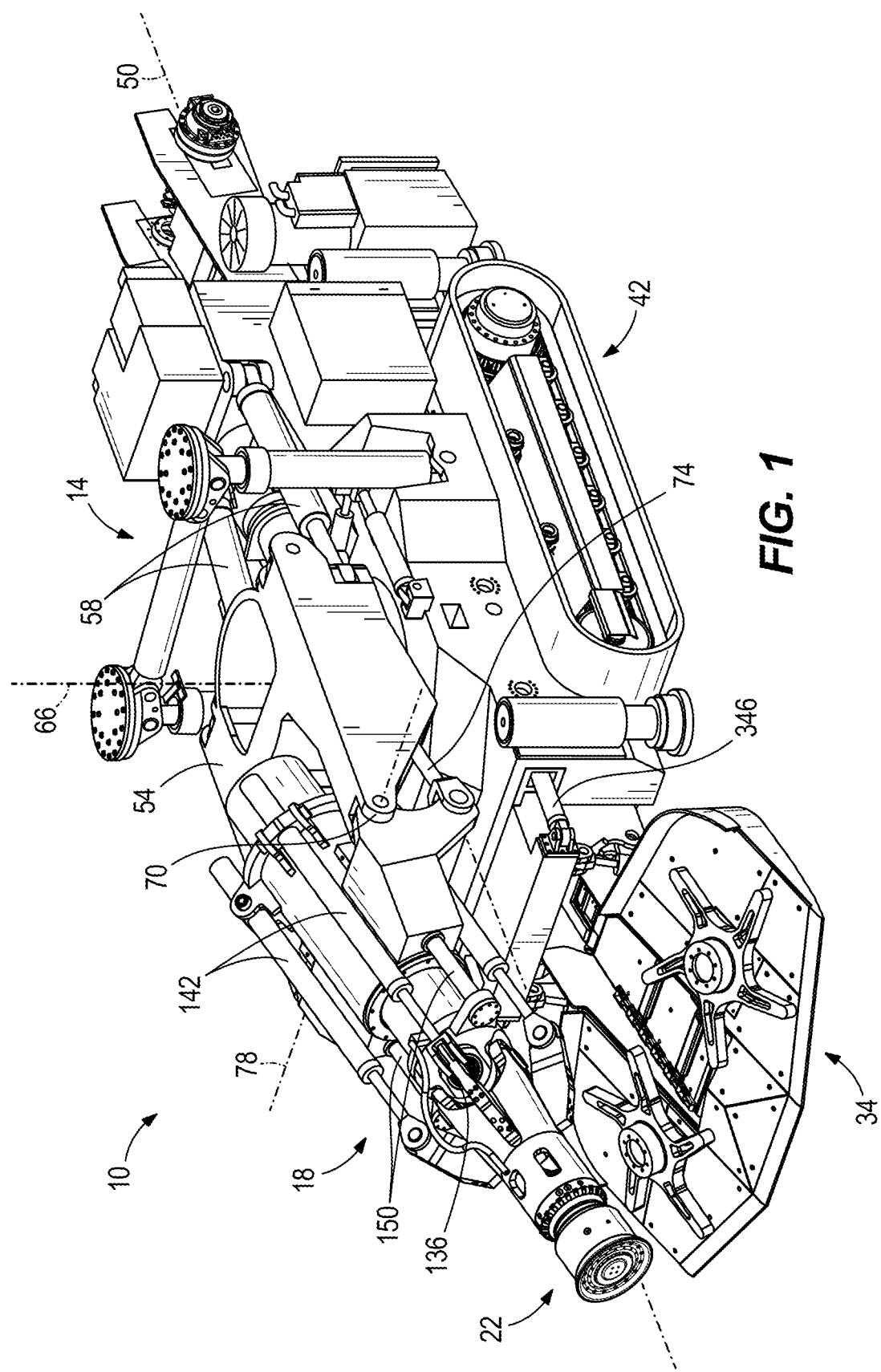
FIG. 1 is a perspective view of a rock excavating machine.
Figure 2:
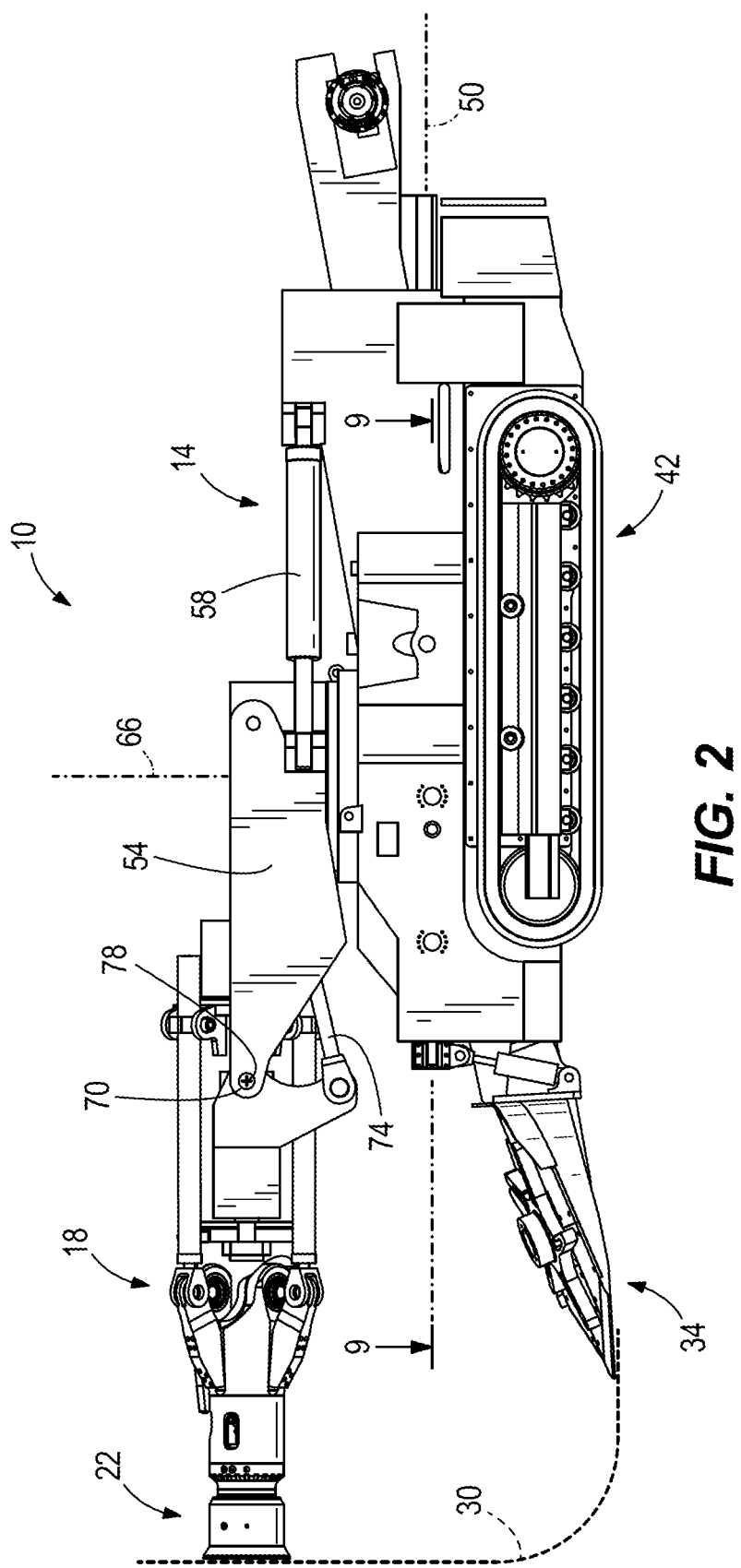
FIG. 2 is a side view of the rock excavating machine of FIG. 1.

FIGS. 1 and 2 illustrate an excavation machine 10 (e.g., an entry development machine) including a chassis 14, a boom 18, a cutter head 22 for engaging a rock face 30 (FIG. 2), and a material handling system 34. In the illustrated embodiment, the chassis 14 is supported on a crawler mechanism 42 for movement relative to a floor (not shown). The chassis 14 includes a first or forward end and a second or rear end, and a longitudinal chassis axis 50 extends between the forward end and the rear end. The boom 18 is supported on the chassis 14 by a turntable or swivel 54. The swivel 54 is rotatable (e.g., by operation of hydraulic cylinders or slew actuators 58) about a swivel axis 66 that is perpendicular to the chassis axis 50 (e.g., a vertical axis perpendicular to the support surface), and rotation of the swivel 54 pivots the boom 18 laterally about the swivel axis 66.

In the illustrated embodiment, the boom 18 is pivotably coupled to the swivel 54 at a luff pivot coupling 70, and luff actuators 74 (e.g., hydraulic cylinders) are operable to pivot the boom 18 and change an elevation of the cutter head 22. Stated another way, the luff actuators 74 pivot the boom about a luff pivot axis 78 that is substantially transverse to the chassis axis 50.

Figure 3:
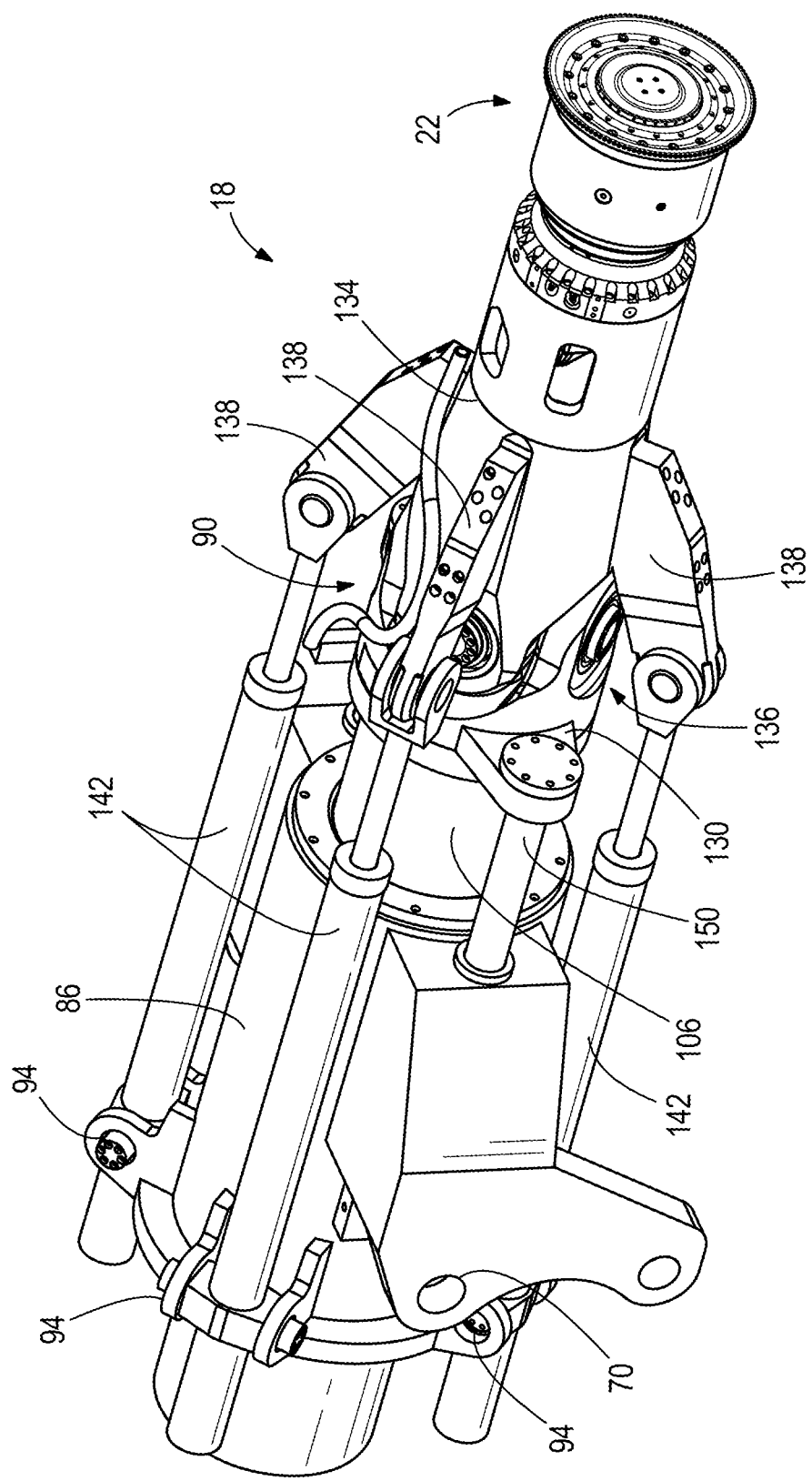
FIG. 3 is a perspective view of a boom and cutting device in an extended state, with a cutter head in an angularly offset position.
Figure 4:
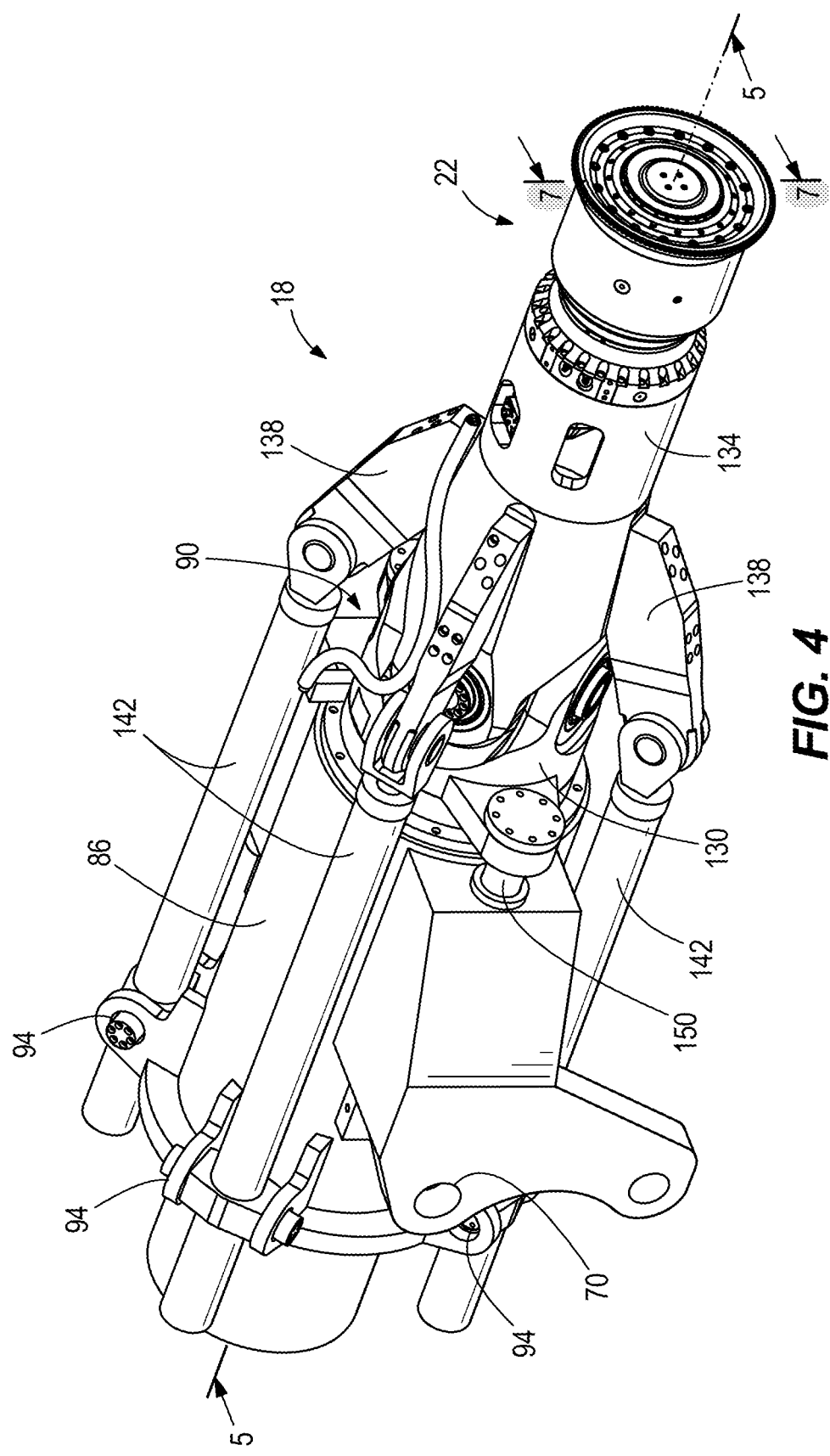
FIG. 4 is a perspective view of the boom and cutting device of FIG. 2 in a retracted state with the cutter head in a nominal, aligned position.
Figure 5:
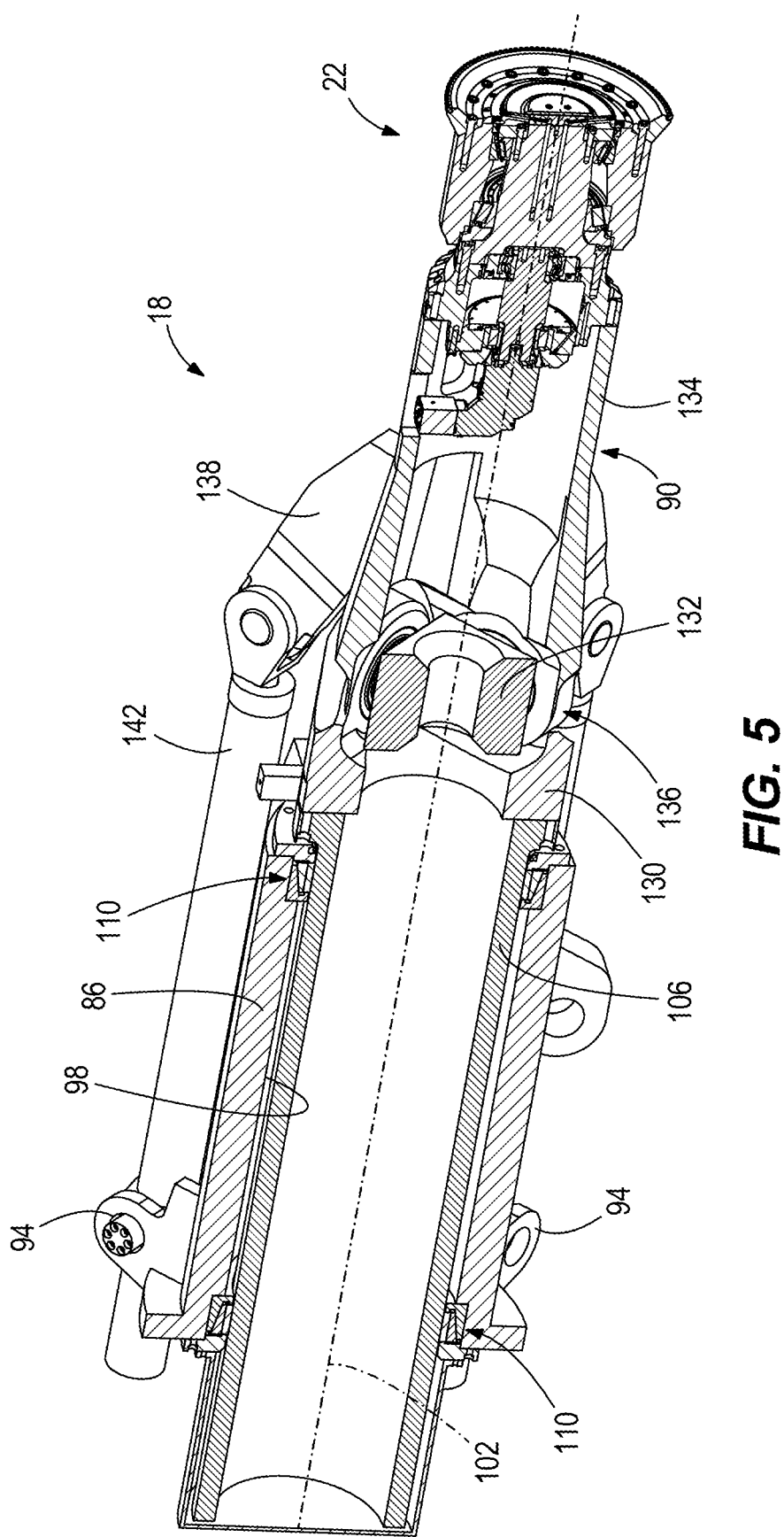
FIG. 5 is a section view of the boom and cutting device of FIG. 4, viewed along section 5-5.

As shown in FIGS. 3-5, the boom 18 includes a first portion or base portion 86 and a second portion 90 supporting the cutter head 22. In the illustrated embodiment, the base portion 86 includes the luff pivot couplings 70 and first support lugs 94. In addition, the base portion 86 includes an opening or bore 98 (FIG. 5) extending along a boom axis 102. The second portion 90 is supported for movement relative to the base portion 86. The first support lugs 94 protrude radially outward from the boom axis 102.

Figure 6:
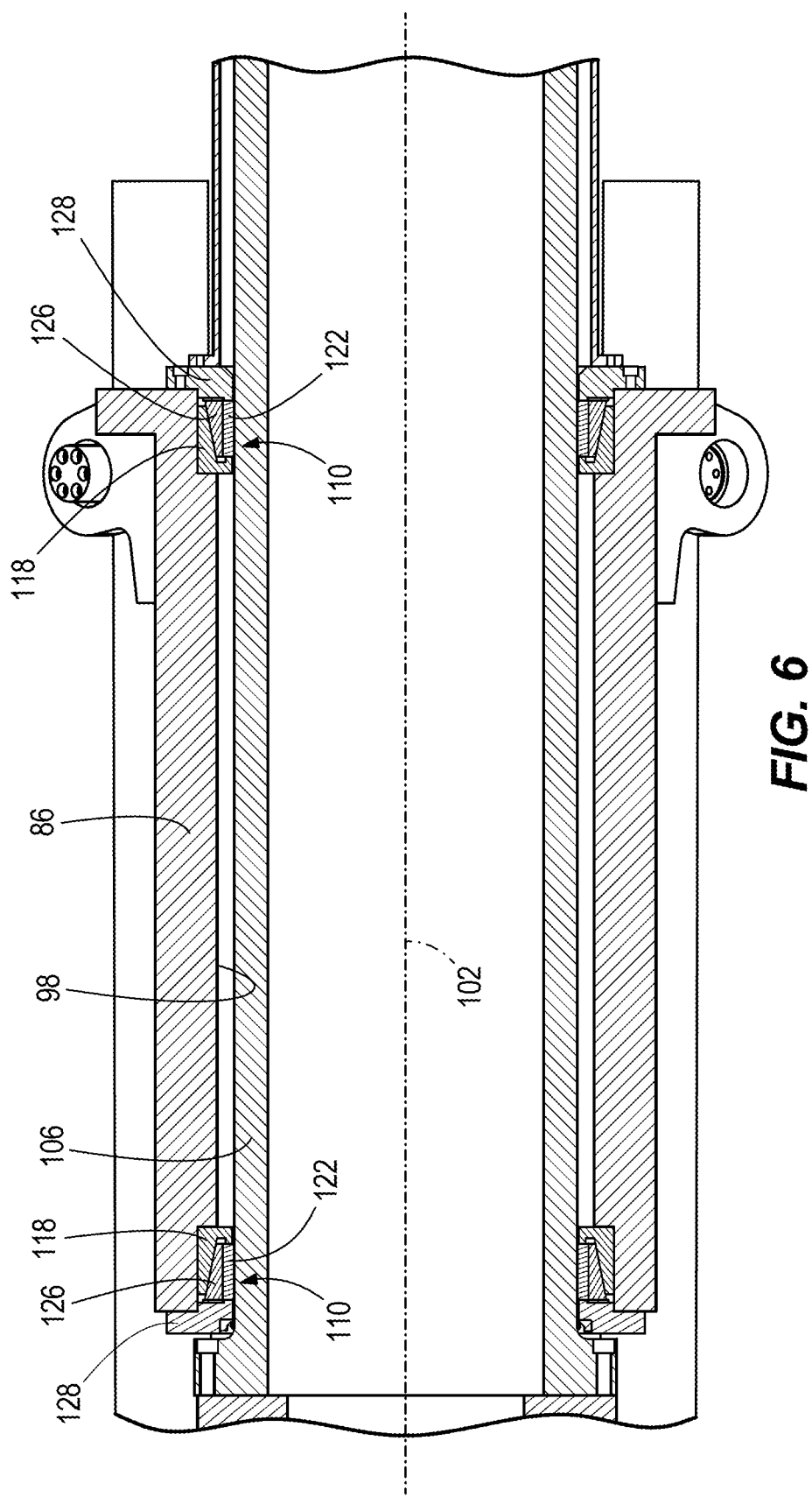
FIG. 6 is an enlarged view of the boom of FIG. 5.

As shown in FIG. 5, in the illustrated embodiment, the second portion 90 includes a cylindrical portion 106, and the cylindrical portion 106 is at least partially positioned in the bore 98 of the base portion 86 and is movable relative to the base portion 86 in a telescoping manner along the boom axis 102. The cylindrical portion 106 is supported relative to the base portion 86 by bearings 110 positioned adjacent each end of the bore 98. As shown in FIG. 6, in the illustrated embodiment, each bearing 110 includes an outer race 118, an inner race or bushing 122, and a wedge 126 positioned between the outer race 118 and the bushing 122. The outer race 118 is secured to an inner surface of the bore 98. The bushing 122 is retained against movement relative to the base portion 86 (e.g., by an end cap 128), and has a sliding interface with the cylindrical portion 106. The wedge 126 is positioned between the outer race 118 and the bushing 122. The wedge 126 can provides radial adjustment to account for wear of the bushing 122, and can assist in avoiding backlash or clearance between the bushing and cylindrical portion 106. In some embodiments, the bushing 122 may be split into multiple segments spaced around the boom axis 102.

Referring again to FIG. 5, the second portion 90 further includes a collar 130 positioned adjacent a distal end of the cylindrical portion 106, and a wrist portion 134 pivotably coupled to the collar 130. The cutter head 22 is positioned adjacent a distal end of the wrist portion 134. In the illustrated embodiment, the wrist portion 134 is coupled to the collar 130 by a universal joint 136 permitting the wrist portion 134 to pivot relative to the collar 130 about two pivot axes (not shown). In the illustrated embodiment, the universal joint 136 includes a hub 132 positioned radially within the collar 130. The hub 132 may include first shaft portions rotatable relative to the collar 130 and second shaft portions rotatable relative to the wrist portion 134. The first shaft portions define a first pivot axis, and the second shaft portions define a second pivot axis. In some constructions the pivot axes are oriented substantially perpendicular to the boom axis 102 and substantially perpendicular to each other. In some embodiments, the universal joint 136 may be similar to a universal joint described in U.S. Publication No. 2018/0051561, published Feb. 22, 2018, the entire contents of which are incorporated by reference herein. Other aspects of universal joints are understood by a person of ordinary skill in the art and are not discussed in further detail. Among other things, the incorporation of the universal joint 136 permits the cutter head 22 to precess about the pivot axes.

Referring again to FIG. 3, an outer surface of the wrist portion 134 includes second support lugs 138, each of which is aligned along the boom axis 102 with one of the first support lugs 94 of the base portion 86. The second support lugs 138 protrude radially outward from the outer surface of the wrist portion 134. A suspension system includes linear actuators 142 (e.g., fluid cylinders) coupled between the first support lugs 94 and the second support lugs 138.

The linear actuators 142 are operable to extend and retract the second portion 90 relative to the base portion 86. For example, extending/retracting all of the linear actuators 142 simultaneously will extend/retract the second portion 90 in a direction parallel to the boom axis 102. Also, operating the linear actuators 142 independently of one another (that is, extending/retracting fewer than all of the linear actuators 142 at the same time) will cause the wrist portion 134 to pivot about the universal joint 136 and position the cutter head 22 at an angular offset relative to the boom axis 102 (see FIG. 3). In addition, the linear actuators 142 can bias the wrist portion 134 in a desired orientation relative to the universal joint 136, thereby acting as biasing elements (similar to springs) to react to static and impact loads exerted on the cutter head 22 by the rock surface 30 (FIG. 2).

In the illustrated embodiment, the suspension system includes four fluid cylinders 142 spaced apart from one another about the boom axis 102 by an angular interval of approximately 90 degrees. The cylinders 142 extend in a direction that is generally parallel to the boom axis 102. In the illustrated embodiment, the suspension system includes four linear actuators, although other embodiments may include fewer or more linear actuators, and/or the linear actuators may be positioned in a different manner. In some embodiments, the cutter head 22 can be extended and retracted in a direction parallel to the boom axis 102 by a distance of 600 mm, enabling the cutter head 22 to perform multiple cutting passes without the need to re-position the machine 10 after each pass. In addition to permitting the cutter head 22 to be extended/retracted to a desired depth along the boom axis 102 and to be positioned at a desired angular orientation relative to the boom axis 102, the linear actuators 142 transfer loads caused by the cutting forces around the universal joint 136, thereby reducing the loads that are exerted on the components of the universal joint 136 and assisting to isolate the components and structures to the rear of the universal joint 136 against the vibrational forces exerted on the cutter head 22.

Referring to FIGS. 3 and 4, torque arms 150 extend between the collar 130 and the base portion 86 and resist torques and torsional loads exerted on the second portion 90 about the boom axis 102. In the illustrated embodiment, the boom 18 includes a pair of torque arms 150, with one torque arm 150 positioned on each lateral side of the second portion 90. Also, an end of each torque arm 150 is secured to the collar 130 and is slidable relative to the base portion 86. In other embodiments, the boom 18 may include fewer or more torque arms, and/or the torque arms may be configured in a different manner.

Figure 7:
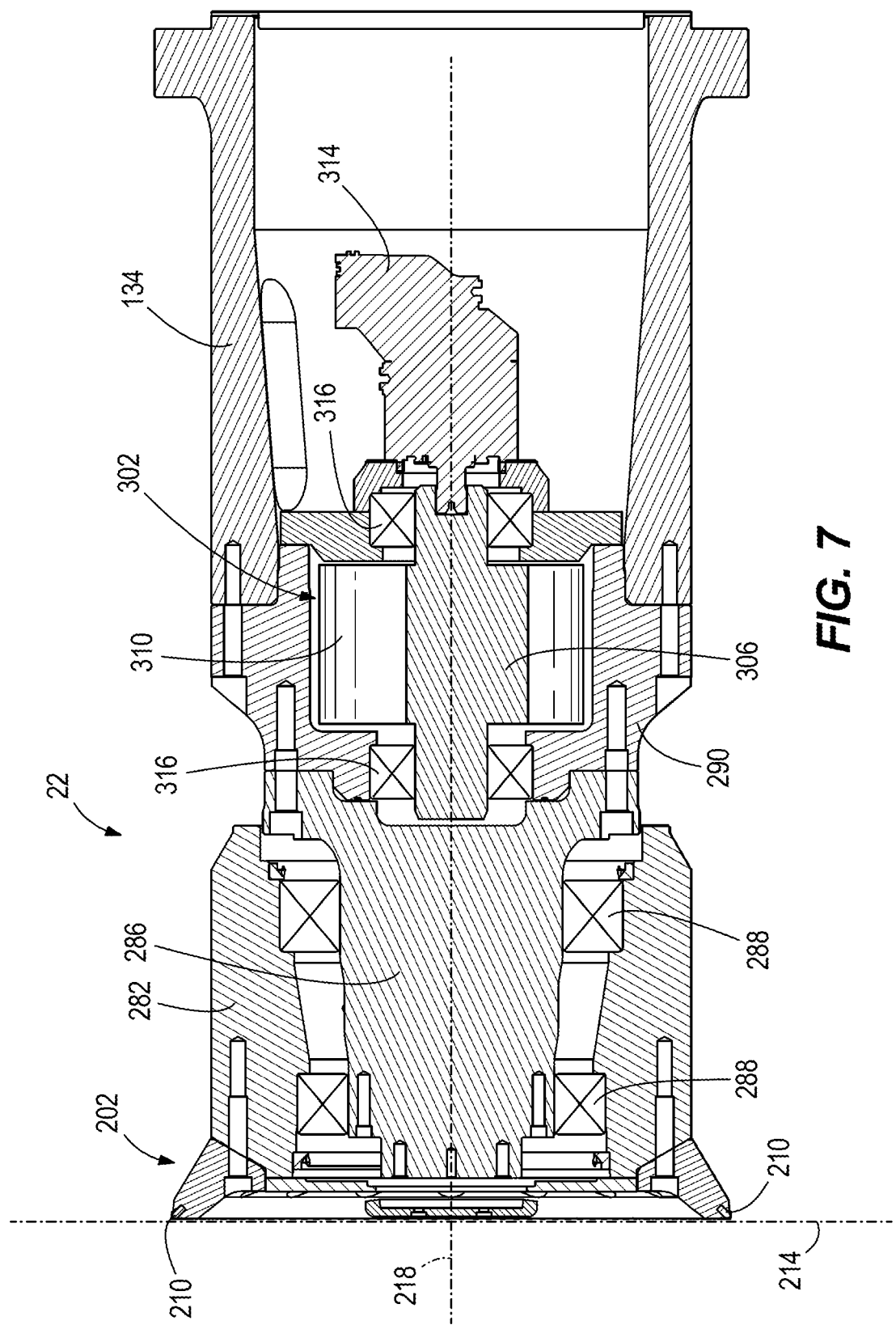
FIG. 7 is a section view of the cutting device of FIG. 4, viewed along section 7-7.

The cutter head 22 is positioned adjacent a distal end of the boom 18. As shown in FIG. 7, in the illustrated embodiment the cutter head 22 includes a cutting member or bit or cutting disc 202 having a peripheral edge, and a plurality of cutting bits 210 are positioned along the peripheral edge. The peripheral edge may have a round (e.g., circular) profile. The cutting bits 210 may be positioned in a common plane defining a cutting plane 214. The cutting disc 202 may be rotatable about a cutter axis 218 that is generally normal to the cutting plane 214. In the illustrated embodiment, the cutter axis 218 is aligned with a longitudinal axis of the wrist portion 134 (FIG. 5).

The cutter head 22 engages the rock surface 30 (FIG. 2) by undercutting the rock surface. The cutting disc 202 traverses across a length of the rock surface in a cutting direction. For example, with respect to the view shown in FIG. 2, the cutting direction may be into or out of the plane of the page. A leading portion of the cutting disc 202 engages the rock surface 30 at a contact point and is oriented at an angle relative to a tangent of the rock surface 30 at the contact point. In some embodiments, the cutting disc 202 is oriented at an acute angle relative to a tangent of the rock surface 30 such that a trailing portion of the cutting disc 202 (i.e., a portion of the disc 202 that is positioned behind the leading portion with respect to the cutting direction) is spaced apart from the surface 30, thereby providing clearance between the rock surface 30 and the trailing portion of the cutting disc 202.

As shown in FIG. 7, the cutter head 22 is positioned adjacent a distal end of the wrist portion 134. The cutting disc 202 is rigidly coupled to a carrier 282 that is supported on a shaft 286 for rotation (e.g., by straight or tapered roller bearings 288) about the cutter axis 218. The cutter head 22 further includes a housing 290. In the illustrated embodiment, the housing 290 is positioned between the distal end of the wrist portion 134 and the shaft 286, and the housing 290 is formed as a separate structure that is removably coupled (e.g., by fasteners) to the wrist portion 134 and removably coupled (e.g., by fasteners) to the shaft 286. In some embodiments, the housing 290 is formed as multiple separate sections that are coupled together.

The housing 290 supports an excitation element 302. The excitation element 302 includes an exciter shaft 306 and an eccentric mass 310 positioned on the exciter shaft 306. The exciter shaft 306 is driven by a motor 314 and is supported for rotation (e.g., by straight or spherical roller bearings 316) relative to the housing 290. The rotation of the eccentric mass 310 induces an eccentric oscillation in the housing 290, the shaft 286, and the cutting disc 202. The rotation is generally centered about the universal joint 136. In some embodiments, the excitation element and cutter head may be similar to the exciter member and cutting bit described in U.S. Publication No. 2014/0077578, published Mar. 20, 2014, the entire contents of which are hereby incorporated by reference. In the illustrated embodiment, the cutting disc 202 is supported for free rotation relative to the shaft 286. Stated another way, the cutting disc 202 is neither prevented from rotating (other than by inertial or frictional forces that may inhibit rotation), nor positively driven to rotate, except to the extent that the induced oscillation caused by the excitation element 302 and/or by the reaction forces exerted on the cutting disc 202 by the rock surface 30 (FIG. 2) cause the disc 202 to rotate.

Figure 8:
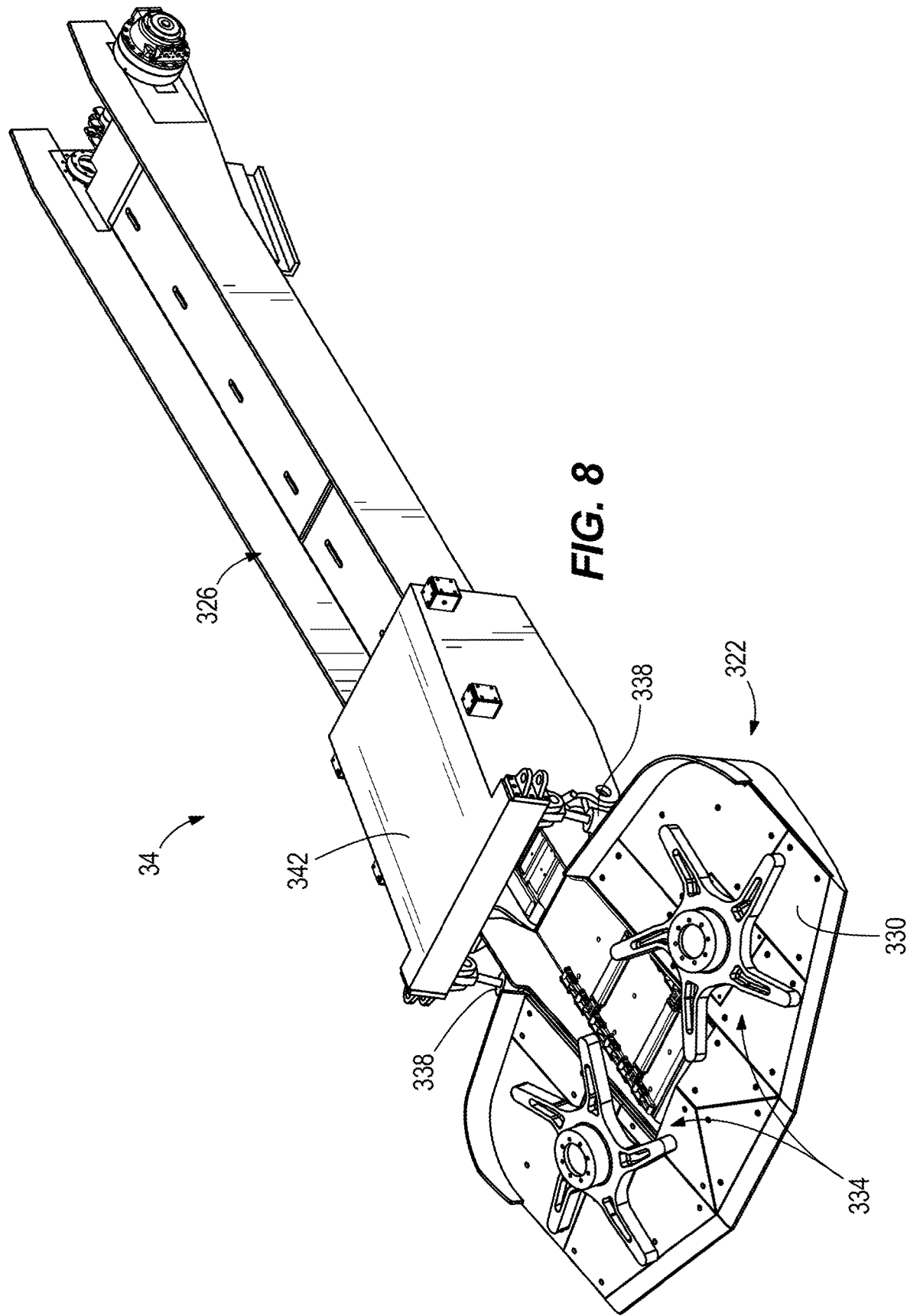
FIG. 8 is a perspective view of a material handling system.

Referring now to FIG. 8, the material handling system 34 includes a gathering head 322 and a conveyor 326 coupled to the gathering head 322. The gathering head 322 includes an apron or deck 330 and rotating arms 334, and the gathering head 322 can be pivoted relative to the conveyor 326 by cylinders 338. As the machine 10 advances, the cut material is urged onto the deck 330, and the rotating arms 334 move the cut material toward the conveyor 326 for transporting the material to a rear end of the machine 10. The conveyor 326 may be a chain conveyor driven by one or more sprockets, with flights or bars for moving cut material along a pan. In other embodiments, the material handling system 34 may include other devices for moving cut material from an area in front of the machine 10.

As shown in FIG. 9, the gathering head 322 and the conveyor 326 are coupled together and are supported for movement relative to the chassis 14. Specifically, the gathering head 322 and conveyor 326 are coupled to a carrier frame 342 that is supported on the chassis 14. Sumping actuators 346 are coupled between the chassis 14 and the carrier frame 342 such that operation of the sumping actuators 346 moves the gathering head 322 and conveyor 326 relative to the chassis 14 in a direction parallel to the chassis axis 50 (movement that is commonly referred to as "sumping"). In the illustrated embodiment, the material handling system 34 can be extended and retracted independent of the extension/retraction of the boom 18, providing versatile control of the cutting and gathering operations.

Although the cutting device support has been described above with respect to a mining machine (e.g., an entry development machine), it is understood that one or more independent aspects of the boom 18, the cutter head 22, the material handling system 34, and/or other components may be incorporated into another type of machine and/or may be supported on another type of machine. Examples of other types of machines may include (but are not limited to) drills, road headers, tunneling or boring machines, continuous mining machines, longwall mining machines, and excavators.

Although various aspects have been described in detail with reference to certain embodiments, variations and modifications exist within the scope and spirit of one or more independent aspects as described. Various features and advantages are set forth in the following claims.

What is claimed is:

1. A cutting assembly for a rock excavation machine, the rock excavation machine including a frame, the cutting assembly comprising:
   a boom including a base portion and a movable portion, the base portion configured to be supported by the frame, the movable portion supported for sliding movement relative to the base portion in a direction parallel to a longitudinal axis of the base portion, the boom further including a wrist portion pivotably coupled to the movable portion at a pivot joint positioned at a distal end of the movable portion relative to the base portion;
   a cutting device supported on a distal end of the wrist portion; and
   a plurality of fluid actuators, each of the plurality of actuators including a first end directly coupled to the base portion and a second end directly coupled to the wrist portion, the fluid actuators being operable to move the movable portion and the wrist portion parallel to the longitudinal axis and being operable to pivot the wrist portion about the pivot joint, the fluid actuators also operable to bias the wrist portion against cutting loads exerted on the cutting device.

2. The cutting assembly of claim 1, wherein the pivot joint is a universal joint, and wherein the fluid actuators are spaced apart at equal angular intervals about the longitudinal axis, each of the fluid actuators positioned radially outward from an outer surface of the boom.

3. The cutting assembly of claim 1, wherein the base portion is configured to be supported on a swivel to pivot laterally relative to the frame about a swivel axis, wherein the base portion is pivotably coupled to the swivel and supported for pivoting movement about a luff axis transverse to the swivel axis.

4. The cutting assembly of claim 1, wherein the movable portion is supported relative to the base portion by a plurality of bearings, each bearing including an outer race engaging the base portion, an inner race engaging the movable portion, and an intermediate member positioned between the outer race and the inner race.

5. The cutting assembly of claim 1, wherein extension and retraction of the fluid actuators causes the movable portion to slide relative to the base portion.

6. The cutting assembly of claim 1, wherein the movable portion includes a cross-section having a round profile, the movable portion supported for sliding movement relative to the base portion by a plurality of bearings, each bearing including an inner race and an outer race extending substantially around the profile of the movable portion.

7. The cutting assembly of claim 1, further comprising a collar coupled to the movable portion, and at least one torque arm coupled between the collar and the base portion.

8. The cutting assembly of claim 1, wherein the wrist portion includes a plurality of support lugs extending radially outward from an outer surface of the wrist portion, each of the fluid actuators coupled to an associated one of the support lugs.

9. The cutting assembly of claim 1, wherein the cutting device includes a cutting disc having a peripheral edge defining a cutting plane, the cutting plane oriented in a direction substantially perpendicular to a longitudinal axis of the movable portion of the boom.

10. The cutting assembly of claim 1, wherein the cutting device includes a cutting disc and an excitation device, the excitation device including an eccentric mass supported for rotation in an eccentric manner and positioned proximate the cutting disc, wherein rotation of the eccentric mass induces oscillation of the cutting device.

11. A cutting assembly for a rock excavation machine, the rock excavation machine including a frame, the cutting assembly comprising:
   a boom supported on the frame, the boom including a first portion and a second portion, the second portion including a first member supported for sliding movement relative to the first portion and a second member pivotably coupled to the first member at a pivot joint positioned at a distal end of the first member relative to the first portion;
   a cutting device supported on the second member; and
   at least one fluid actuator including a first end directly coupled to the first portion and a second end directly coupled to the second member, the at least one fluid actuator being operable to both translate and pivot the second member relative to the first portion, the at least one fluid actuator supporting the second member against cutting loads exerted on the cutting device.

12. The cutting assembly of claim 11, wherein the pivot joint is a universal joint, and wherein the at least one fluid actuator includes a plurality of fluid actuators spaced apart at equal angular intervals about a longitudinal axis of the boom, each of the fluid actuators positioned radially outward from an outer surface of the boom.

13. The cutting assembly of claim 11, wherein the first portion is supported on a swivel to pivot laterally relative to the frame about a swivel axis, wherein the first portion is pivotably coupled to the swivel and supported for pivoting movement about a luff axis transverse to the swivel axis.

14. The cutting assembly of claim 11, wherein the first member is supported relative to the first portion by a plurality of bearings, each bearing including an outer race engaging the first portion, an inner race engaging the first member, and an intermediate member positioned between the outer race and the inner race.

15. The cutting assembly of claim 11, wherein extension and retraction of the at least one fluid actuator causes the first member to slide relative to the first portion.

16. The cutting assembly of claim 11, further comprising a collar coupled to the first member, and at least one torque arm coupled between the collar and the first portion.

17. A cutting assembly for a rock excavation machine, the rock excavation machine including a frame, the cutting assembly comprising:
   a boom configured to be supported by the frame, the boom including a base portion and a movable portion received within the base portion, the movable portion supported for sliding movement relative to the base portion in a direction parallel to a longitudinal axis of the base portion, the boom further including a wrist portion pivotably coupled to the movable portion at a pivot joint positioned at a distal end of the movable portion relative to the base portion;
   a plurality of bearings supporting the movable portion for sliding movement relative to the base portion, each bearing including an outer race engaging the base portion and an inner race engaging the movable portion;
   a cutting device supported on a distal end of the wrist portion; and
   a plurality of fluid actuators including a first end directly coupled to the base portion and a second end directly coupled to the wrist portion, the fluid actuators being independently operable to move the wrist portion relative to the base portion, the fluid actuators also operable to bias the wrist portion against cutting loads exerted on the cutting device.

18. The cutting assembly of claim 17, wherein the pivot joint is a universal joint, and wherein the fluid actuators are spaced apart at equal angular intervals about a longitudinal axis of the boom, each of the fluid actuators positioned radially outward from an outer surface of the boom.

19. The cutting assembly of claim 17, wherein the fluid actuators are independently operable to pivot the wrist portion relative to the base portion, and wherein the fluid actuators are simultaneously operable to move the movable portion and the wrist portion parallel to the longitudinal axis.

\* \* \* \* \*